July 9, 1963
C. H. SAVIT ETAL
3,096,846
METHOD AND APPARATUS FOR SEISMOGRAPHIC EXPLORATION
Filed Dec. 31, 1958
3 Sheets-Sheet 1
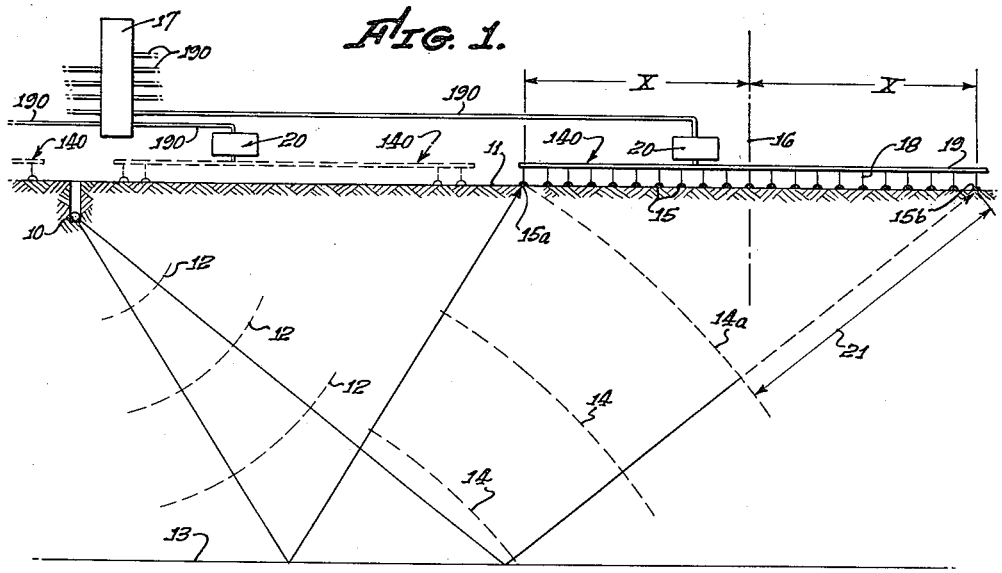
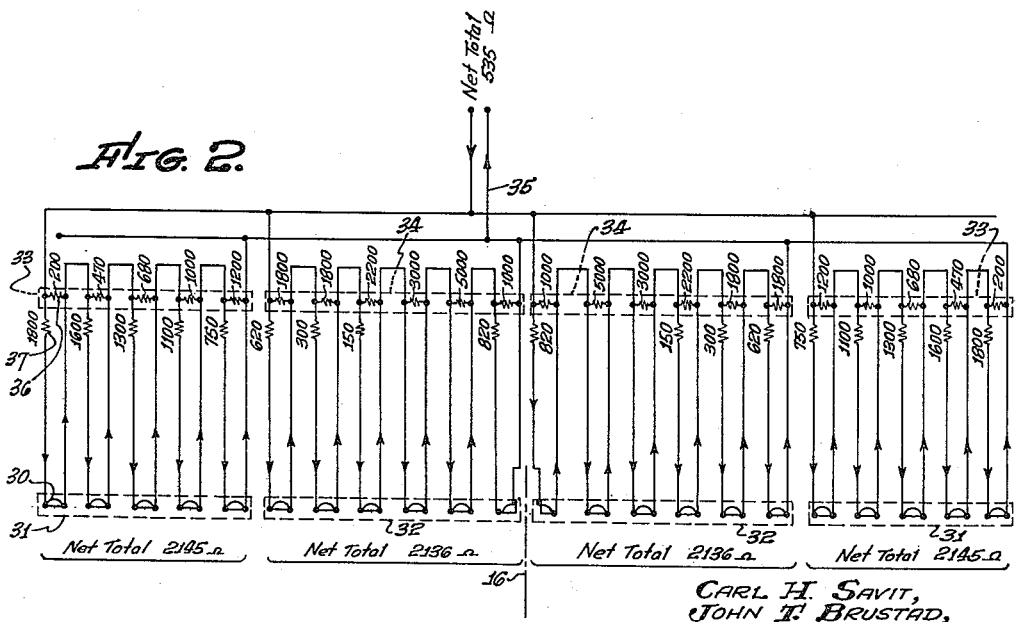
CARL H. SAVIT,
JOHN T. BRUSTAD,
JOSEPH SIDER,
INVENTORS.
BY *H. Calvin White*
ATTORNEY.

CARL H. SAVIT,
JOHN T. BRUSTAD,
JOSEPH SIDER,
INVENTORS.

BY [signature]

ATTORNEY.

United States Patent Office 3,096,846
Patented July 9, 1963

3,096,846
METHOD AND APPARATUS FOR SEISMOGRAPHIC EXPLORATION
Carl H. Savit, Van Nuys, and John T. Brustad, Downey, Calif., and Joseph Sider, Poughkeepsie, N.Y., assignors to Western Geophysical Company of America, Los Angeles, Calif., a corporation of Delaware
Filed Dec. 31, 1958, Ser. No. 784,170
10 Claims. (Cl. 181—.5)

This invention relates to novel methods and apparatus concerning seismological instrumentation for selectively accepting or rejecting seismic wave energy, and more particularly has to do with materially improving the signal-to-noise amplitude relationships established by the electrical outputs of seismographic detectors arranged in one or more arrays. Fundamentally the invention contemplates the achievement of substantially increased selectivity by detector arrays as between the acceptance of desired signal reflections and the rejection of unwanted noise, based on the phenomenon of so-called "moveout" discrimination of such detector arrays. This application is a continuation-in-part of our pending application entitled "Improved Method and Apparatus for Seismographic Exploration" by Carl H. Savit, John T. Brustad and Joseph Sider, Serial No. 482,054, filed January 17, 1955, now abandoned.

The term "noise" as used in the following description has reference to all seismic wave energy other than that resulting from reflections of given wave signals from subterranean geologic interfaces. Reflected signals, on the other hand, comprise seismic wave energy traveling upward toward the detection equipment at the surface of the earth, the signals having first traveled downward into the earth from explosion points or shot holes at the surface of the earth.

It has been customary to attempt to distinguish such reflected signals from noise energy incident upon detection equipment in order that accurate information as to geological structure may be recorded. Such efforts have generally been pursued by attempting to maximize the amplitude ratio of received signal energy to received noise energy, referred to as the signal-to-noise ratio, in the detection equipment. For example, it is conventional practice to consider that the signal-to-noise ratio varies approximately as the square root of the number of detectors utilized, and on the basis of this assumption it has been felt that continuing improvement in reflection records might be expected by increasing indefinitely the number of detector elements used. Contrary to expectations, field results have indicated the presence of "saturation" operating to limit expected improvement in reflection records to such an extent that for many geological areas it is not possible to obtain intelligible, interpretable seismographic records of subterranean structure, no matter how many detectors are used.

The present invention is founded on the observation that seismic reflection signals have certain properties not possessed by seismic noise energy, in that reflection signals consist of wave energy arriving at a group of detectors with one velocity, and from directions which are limited by the geometry of the detector group as related to that of the shot holes and the geological section, while on the other hand, noise may be considered to consist of individual trains of wave energy arriving by various paths and at various velocities.

In this connection, it is desirable to describe the reception of signal and noise wave energy at the detectors in terms of "moveout," which may be defined as the ratio of the time interval between the arrival of an incident wave at two or more spaced detectors to the distance between these detectors, or in other words the reciprocal of the velocity of propagation of the incident seismic wave in the direction of a row of detectors. It has generally been observed that seismic reflection signals cover a relatively restricted range of moveouts or phase velocities ranging from a moveout of zero per unit length (infinite phase velocity) to moveouts not exceeding some small value, and in any event not exceeding the moveout to be expected from direct travel of the seismic "P" waves, or surface waves, from the shot holes to the detectors. It has furthermore been noted that the bulk of the unwanted disturbances or noise generally had moveouts greater than the greatest to be expected from reflections. For example, it may generally be stated that in most areas the bulk of signal moveouts lie within the range 0 to 8 milliseconds per 100 feet, whereas most noise moveouts include and are greater than those corresponding to horizontally travelling "P" waves, that is horizontal shot blast waves travelling directly toward the detectors, which in limestone areas are equivalent to about 8 milliseconds per 100 feet. In general it may be said that the bulk of noise moveouts in all areas will exceed 6 milliseconds per 100 feet. On this basis it is possible to distinguish reflected signals from noise incident upon the detectors due to the substantially disjunct moveout relationships as between signals and noise, and it is possible to arrange arrays of seismic detectors and/or seismic shot holes or other seismic impulse initiating elements so as to establish within acceptable and practical limits any desired moveout response relationship.

It must be emphasized that improvement of seismographic recording requires more than a mere reduction of the absolute level of unwanted "noise" entering the instruments. The overriding consideration is that the ratio of desired signal to that of unwanted noise be as high as possible. A seismograph recording is not improved by reduction of noise level if the signal level is reduced in the same proportion.

Methods of the prior art have been concerned with minimizing the maximum noise received by the system. Such methods are effective only if the noise consists of isolated bursts of noise appearing at random values of moveout. Such noise systems are exceedingly rare if they exist at all. Experiments have consistently proved that troublesome noise is distributed over a continuum of moveouts and particularly is not concentrated at specific moveouts.

It is thus an object of this invention to provide means for reducing the total amount of noise in relation to the amount of signal received by a seismograph system. In this connection, reference is made to applicants' article "The Moveout Filter" published in Geophysics January, 1958, vol. 20, pp. 539–564.

As noted above, a uniform array of detector elements, that is a group of detectors each having the same output and arranged in a row at uniform intervals, will have a recordable output indicative of a certain amount of signal-to-noise amplitude discrimination merely by virtue of the fact that a number of detectors are being utilized. This is so, because of the generally disjunct relationship between signal and noise moveouts, the more detectors being used the better relative response to signal moveout as compared with noise moveout being obtainable up to the point of saturation. In addition to inherent moveout discrimination, the outputs of such arrays may be subjected to conventional electrical amplification and filtering to improve further the signal-to-noise amplitude ratio desired. However, mathematical analysis indicates that the use of more than 10 detector elements will not result in significant improvements in signal-to-noise ratio, which is borne out by observed saturation effects in the field.

Materially improved results can be obtained, however, through the use of non-uniform arrays of detectors in which the detectors have equal outputs and are situated at unequally spaced precalculated points, or in which the detectors have unequal outputs and are situated at uniformly spaced points. The spacing in the first instance and the output weighting in the second instance constitute the means by which the moveout discrimination properties of the detector array may be substantially improved. A combination of the two methods may also be used, in that detectors of precalculated sensitivity may be located at precalculated points to achieve the same type of result. Variable outputs of detector elements, such as seismometers or geophones, may be effected by the use of suitable electrical circuits within the detectors themselves, within the cable or cables to which the detectors are connected, within the recording instruments, or within separate instrument units used in conjunction with these elements. Alternatively, variable outputs may be obtained by the use of different numbers of detectors at desired locations or on a system of lines or arcs at precalculated points along the detector spread.

These concepts may be validly applied to the signal impulse initiating systems instead of the detector elements, such systems consisting of various types of seismic wave generators such as detonations, propellants, mechanical impacts and gaseous discharges. Variable strengths of impulses may be effected by using charges of different sizes or by using a variable number of charges of the same size in the same or adjacent locations.

As will be brought out in the description, the groups of detectors are preferably arranged in one or more symmetrical arrays, each array consisting of individual detectors disposed in symmetric pairs with respect to a center point or to a detector at a center point. An arrangement of the detectors in anti-symmetric arrays is, of course, possible; however, for practical reasons symmetric arrays are preferable in view of the necessity in common practice of using the same detector array for impulses initiated at opposite ends of a line of arrays. Furthermore, the present description will be limited to uniformly spaced detectors having variable outputs, since variable spacing of detectors requires an excessive number of detectors to achieve comparable results and since the determination of the spacing of detectors having equal outputs to obtain the desired improvements in signal-to-noise ratio is of such mathematical difficulty that for practical purposes it is not desirable.

Further improvement in attenuation of the noise energy may be obtained by compositing two or more detector arrays, that is, combining two or more collinear arrays to multiply the number of detector elements and at the same time increase the effective length of an array.

These and other features and objects of the invention, as well as the details of an illustrative embodiment, will appear more fully understood from the following description of the accompanying drawings, in which:

FIG. 1 is an elevation illustrating the ground location of a group of detectors with respect to a subterranean geologic section and a shot hole;

FIG. 2 illustrates a preferred circuit arrangement for establishing the desired outputs of the detectors;

Figure 3:
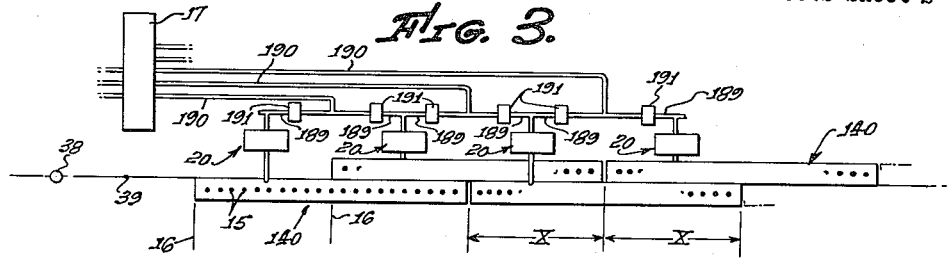
FIG. 3 is a plan view illustrating a method of compositing two groups of detectors with relation to the location of a shot hole.

In FIG. 1, there is shown a shot hole 10 adapted to receive an explosive charge below the surface 11 of the earth, which charge when detonated is productive of seismic waves 12 travelling downward into the earth toward a reflecting surface 13, which may, for example, comprise an interface between two dissimilar geologic strata. Although only one shot hole is shown, it is common to use a series of shot holes, which for the purposes of this invention will produce the same results. When waves 12 impinge upon interface 13, a portion of the wave energy passes through the interface, while the remainder of the wave energy is reflected as shown by wave lines 14 travelling angularly upward toward the surface of the earth. A group 140 of seismic wave energy detectors 15 is shown to be located at the surface, each detector being in ground contact for the reception of incident seismic wave reflections 14. In accordance with the invention, the group of detectors is arrayed in a row extending on opposite sides of a vertical ground center line 16, the detectors being spaced at substantially equal intervals and on opposite sides of the center line in symmetric pairs as regards their spacing from the center. It will be understood that other groups of detectors, similarly arrayed, are disposed substantially collinearly on opposite sides of shot hole 10.

The detector outputs in each group 140 are conducted to a detector circuit 20 via leads 18 and cable 19, one possible detector circuit being described in detail in connection with FIG. 2. From this detector circuit 20, the detector group outputs are led to a recording instrument 17 via separate cables 190 for comparative recordation of the group outputs. The recording unit 17 will be understood to comprise all additional circuitry such as amplifiers, filters, mixers and the actual recording means utilized, such as an oscilloscope and camera, or magnetic tape recorder. Upon reception of an incident seismic signal, each of the detectors responds to produce an electrical output which is established in a definite relation to the outputs of the other detectors in its group in such a way as to effect an increased tendency of the detector circuit 20 to accept or reject a seismic wave disturbance, depending on its "moveout" characteristics. In this connection, an appreciation of the meaning of the term "moveout" is gained from a consideration of FIG. 1, in which seismic wave 14a is shown to have arrived at the end detector 15a in the array, with subsequent progressive arrival at the remainder of the detectors in a rightward sense. Wave 14a will, accordingly, traverse in an arriving sense the array of detectors in the time interval consumed by wave travel over the distance 21 shown in FIG. 1 to extend perpendicularly between wave front 14a and the opposite end detector 15b. Accordingly, moveout is defined as the time taken or the time consumed by the seismic wave front to travel a unit distance in the direction of the detector array, and may be readily measured at any locality. An associated term "phase velocity," is defined as the reciprocal of moveout. As will appear, the FIG. 1 detector array and circuit 20 comprise a filter means for producing a combination amplitude response that is a least squares best fit to unit response over a first range of moveouts corresponding to the bulk of detected desirable seismic disturbances, and to zero response over a second range of moveouts corresponding to the bulk of detected unwanted seismic disturbances.

As brought out in the introduction, wave fronts representing both signal and noise are received by the detectors, and it is desirable to suppress or attenuate the detected noise energy in order to minimize interference with the detection of signal waves 14 reflected from geologic interfaces, the subterranean positions and inclinations of which interfaces are desired to be ascertained. Such attenuation may be achieved by the mere use of an array of detectors having uniform outputs, and the basis for this discrimination against noise energy is the phenomenon of substantially disjunct moveout relationships as between signal and noise wave energy, and the inherent moveout response characteristics of such arrays.

Figure 5:
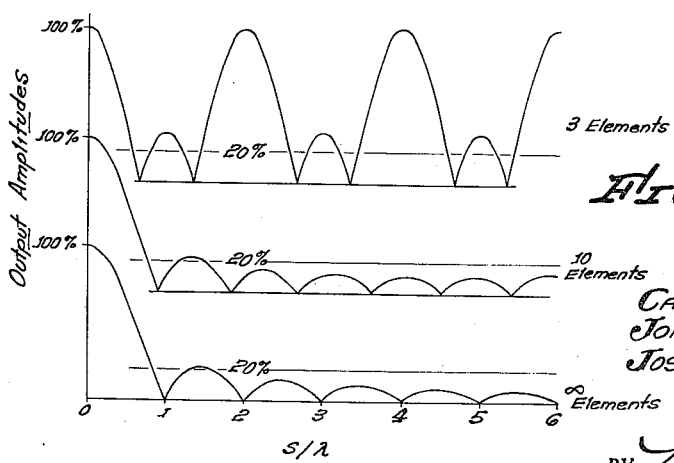
FIG. 5 is a graph comparing the output amplitudes of uniform arrays of detectors in which various numbers of detectors are utilized, as a function of a dimensionless quantity involving wave length of an incident seismic signal.

For purposes of explanation, the bulk of signal moveouts are observed to lie within the range of 0 to 8 milliseconds per 100 feet whereas the bulk of noise moveouts range from 6 to 100 or more milliseconds per 100 feet. Since moveout is related to wave lengths of incident seismic wave components travelling in the direction of the detectors, it is possible to show that the arrangement of a group of detectors in a row will bring about the tendency for the uniformly arrayed detector group to accept seismic waves having lower moveouts associated with signal reflections, and reject seismic waves having higher moveouts associated with noise. Thus it may be shown theoretically that the amplitude of the group output of a uniform array of M detectors having equal outputs and spaced at equal intervals over a distance of length S is represented by the expression:

$$A_\mathrm{m} = \frac{\sin\left(\frac{M}{M-1}\frac{\pi S}{\lambda}\right)}{M \sin\left(\frac{1}{M-1}\frac{\pi S}{\lambda}\right)}$$

where $\lambda$ = the wave length of an incident sinusoidal seismic signal component travelling along the length of the array. When $A_\mathrm{m}$ is normalized on the basis that $$\lim_{\lambda \to \infty} A_\mathrm{m} = 1$$

and graphed as a function of the dimensionless quantity $S/\lambda$, proportional to reciprocal seismic signal wave lengths, the result appears as shown in FIG. 5, showing detector group output amplitudes for 3, 10 and an infinite number of detectors. In interpreting this graph it will be observed that the lower values of $S/\lambda$ correspond to reflected signal moveouts and to less suppressed amplitudes, whereas the larger values of $S/\lambda$ correspond to noise moveouts, and to more suppressed amplitudes. This graph further shows that increasing the number of detectors beyond about 10 yields no appreciable improvement in moveout discrimination for groups of seismometers having equal outputs and uniform spacing in an array.

Suppression or attenuation of seismic noise received by the detector array may be significantly and substantially increased over the degree of noise suppression inherently provided by a uniform array by the provision of a non-uniform array of detector elements. Such an array may be non-uniform in the sense of unequal spacing as between the individual detector elements, unequal outputs of the individual detector elements, or in the sense of a combination of unequal spacing and unequal outputs of the detector elements. In any case the distribution of the detectors or the responses of the detectors or both are determined by requiring that the response of the detector system be a least-squares best fit to unit response over the range of signal moveouts and to zero response over the range of noise moveouts. This design criterion has the effect of maximizing the signal-to-noise ratio in that the total quantity of noise will thereby be reduced in relation to the signal. By contrast, the prior art methods sought at best to minimize the maximum noise sensitivity value over a given range. It is further to be noted that the least squares method produces the best possible approximation to the "ideal" response of unity for signal and zero for noise. Thus the detector system whose weighting or distribution is determined by the least-squares method is necessarily superior to a system of detectors with any weighting other than those of the present invention, such as the arbitrarily uniform or linear weighting methods of the prior art. The present description will be confined to a non-uniform array in which the detector elements are equally spaced and have unequal outputs, as determined by the following derived mathematical expression which is the mathematical result of applying the least-squares best fit criterion to fit the array response to the ideal response function $A(\alpha)$ $$r_k = \frac{X}{2\pi n}\int_{-\pi n/X}^{\pi n/X} A(\alpha) \cos\frac{\alpha k X}{n}d\alpha$$
$$+ \frac{1}{1+2n}\bigg[1 - \frac{X}{2\pi n}\int_{-\pi n/X}^{\pi n/X} A(\alpha)d\alpha$$
$$- 2\sum_{j=1}^{n}\frac{X}{2\pi n}\int_{-\pi n/X}^{\pi n/X} A(\alpha)\cos\frac{\alpha j X}{n}d\alpha\bigg]$$

in which:
$r$ = relative output of any detector,
$k$ = the detector whose output is under determination, where $k$ increases in a direction away from the center of the array,
$n$ = the selected number of detectors on each side of center,
$X$ = the selected length of the detector array on each side of the center of the array,
$A(\alpha) = 1$ when $\alpha$ is equal to or lies between 0 and $$\frac{n\pi}{dX}$$

$A(\alpha) = 0$ when $\alpha$ is greater than $$\frac{n\pi}{dX}$$

$d$ = a number equal to or less than the value of the expression $$\frac{nv}{2X\omega}$$

where:
$v$ = a value of "phase velocity" less than the bulk of reflected seismic signal phase velocities as measured at a particular locality, and
$\omega$ = a value of frequency greater than the bulk of transmitted shot frequencies as measured in a particular locality,
$j$ = an index of summation,
$\alpha$ = the variable of integration.

The above expression relates the individual outputs of equally spaced, symmetrically arrayed detector elements in such a way as to establish equal outputs as between symmetrically spaced detectors on opposite sides of a ground center and progressively decreasing detector outputs away from the center. In other words, when the detectors are positioned symmetrically on opposite sides of the center, and when the outputs are adjusted in accordance with the above expression, there is provided a so-called "tapered" array, characterized by progressively decreasing detector outputs away from the center and on opposite sides thereof. Furthermore, the outputs are so related that a combination thereof effects a substantial cancellation of signal resulting from incident seismic wave energy having moveouts equal to or greater than moveouts resulting from shot waves travelling directly toward the detectors from the shot area. The above mathematical formulation expresses the condition that the detector outputs shall be determined by minimizing the integral of the square of the difference between the ideal amplitude response curve and the actual amplitude respone curve resulting from combining the responses of the detectors. The ideal amplitude response curve is defined as having 100% response in the range of $S/\lambda$, or reciprocal seismic signal wave lengths, inclusive of the bulk of signal moveouts, and a zero response in the range of $S/\lambda$ inclusive of the bulk of noise moveouts.

A specific determination for a particular area of the relative values of the detector outputs for an array of 21 detectors is given in Table 1 below. A 21 detector array was chosen since ten detectors arrayed on each side of a center detector yield very good discrimination, as previously described, and result in practical detector spacing as will be shown. The spacing between adjacent seismometers was chosen to be 20 feet so as to be less than the smallest wave length associated with noise of substantial wave energy. The only important known source of substantial noise energy associated with the smaller wave lengths is the shot air blast, the wave length of which under normal conditions varies between 38 and 23 feet for frequencies between 30 and 50 cycles per second, which frequency range covers the bulk of the shot frequencies transmitted and desirably accepted by the filtering system used.

The value of 2X, or the total length of the array should be equal to at least the maximum wave length of appreciable incident seismic noise, so as to maximize noise attenuation. Accordingly, X should be equal to at least 100 feet for all areas. For the specific area under consideration, the maximum wave length of appreciable seismic noise was less than 400 feet, and with a spacing of 20 feet between individual detectors and ten detectors on each side of center, the value of X was determined to be 200 feet. More than ten detectors or a larger spacing between detectors up to 23 feet may, of course, be used to increase the value of X. If less noise attenuation is acceptable, the value of X may be decreased, thereby economizing in the number of detectors used.

The upper limit of the usable range of values of "$d$" was determined to be approximately 16 for the particular area involved by evaluating the expression $$\frac{nv}{X2\omega}$$

in which $n$ equals 10, $X$ equals 200 feet, $v$ equals the reciprocal of the moveout value 3 milliseconds per 100 feet, and $\omega$ equals 50 cycles per second. The value 3 milliseconds per 100 feet was chosen as corresponding to a value of phase velocity less than the bulk of phase velocities of the reflected signals as measured for the area involved. Since values of "$d$" between 0 and 16 could be used, the value 12 was selected in order to make the relative output of the $(n+1)$th detector equal to 0. As a result, the relative outputs of all the detectors were positive, enabling all the detectors to have the same polarity, and at the same time adding to the effectiveness of moveout discrimination since the array in effect included two "additional" detectors having 0 output. It is, of course, understood "$d$" might have been given a value within the 0 to 16 range such that some of the detectors would have a negative output.

In practice, at least two detectors should be used on each side of the center detector to obtain good results, the array then including a total of five detectors. The value of X is then less than 100 feet, giving less noise attenuation; nevertheless, satisfactory results may be realized in certain areas with only five detectors.

Table 1

| | |
|---|---|
| $r_0 = 1.000$ | $r_6 = .592$ |
| $r_1 = .987$ | $r_7 = .473$ |
| $r_2 = .947$ | $r_8 = .348$ |
| $r_3 = .888$ | $r_9 = .224$ |
| $r_4 = .809$ | $r_{10} = .105$ |
| $r_5 = .704$ | |

The detector sensitivities or outputs given in Table 1 were obtained by substituting in the equation given on column 6 the values for $n=10$, $X=200$ feet, $d=12$, $1/v=3$ milliseconds/100 feet, and $\omega=50$ cycles per second.

Figure 6:
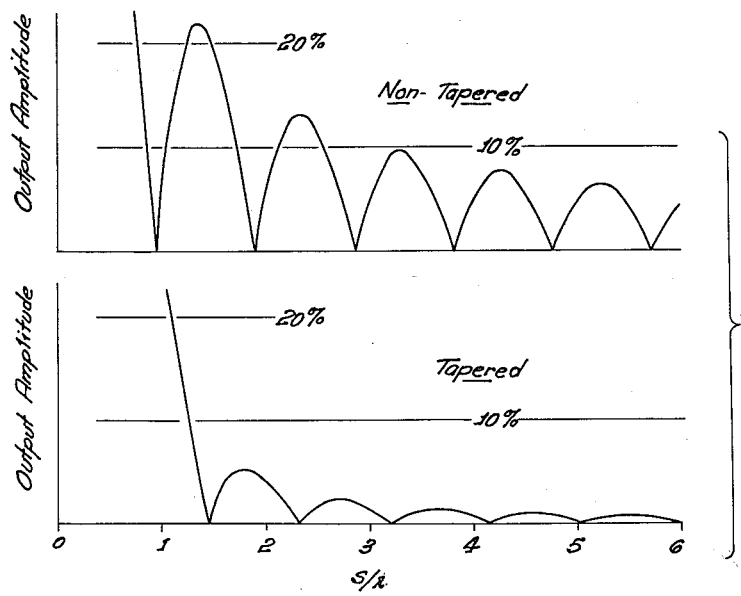
FIG. 6 is a graph comparing the output amplitudes of a non-tapered array of detectors with a tapered array of detectors, as a function of a dimensionless quantity involving wave length of an incident seismic signal.

The graph illustrated in FIG. 6 gives a comparison of the relative outputs of uniform arrays as against output-tapered arrays of detector elements, as a function of the quantity $S/\lambda$. Here again, the lower values of $S/\lambda$ correspond to reflected signal moveouts and to higher output amplitudes of the detector group, while the larger values of $S/\lambda$ correspond to noise moveouts and to suppressed output amplitudes of the detector group. The sensitivities or relative outputs of the detector elements in the tapered array are listed in Table 1, whereas the sensitivities of the elements in the non-tapered array are all equal. Furthermore, both arrays are equally spaced and include 21 detector elements. The graph shows that significant improvements in the suppression of detector output amplitudes associated with noise may be achieved by a tapered array of detector elements. Also, the graph indicates the occurrence of attenuation of the combined detector output resulting from incident noise, at corresponding values of $S/\lambda$ greater than about 1⅓. It follows that the response of the combined detectors is on the average very small for values of $S/\lambda$ greater than about 1⅓ or for values of $\lambda$ less than ¾ S.

The detector circuit illustrated in FIG. 2 includes a group of 22 detectors 30, arranged in pairs of detector sets 31 and 32, which are positioned symmetrically with respect to ground center. All of the detectors are shown to be spaced at 20 foot intervals except for the two center detectors which are spaced at a 1 foot interval, and which for practical purposes may be considered to comprise a single center detector positioned at ground center. Symmetric pairs of voltage dividers 33 and 34 are connected respectively across the symmetric pairs 31 and 32 of detector sets, and the voltage dividers are mutually connected in a parallel relation with the output leads 35 of the detector circuit.

It will be observed that each detector is connected across a resistor 36 in a voltage divider, and that certain of the detectors have resistors 37 connected in series therewith, the necessity for resistors 37 being readily determined by network calculation. The detectors themselves are each of 200 ohms resistance. The resulting series and parallel connections of the resistors 36 and 37 to certain of the detectors, and parallel resistor 36 connections to the remainder of the detectors serve to establish relative detector outputs substantially in accordance with the sensitivities given in Table 1. In addition, it will be observed that the resistance values of the detectors and resistors are such that the combined resistance of each voltage divider and connected detector group is substantially equal to the resistance of each of the other voltage dividers and connected detector groups. As a result, the detector circuit as a whole is balanced and provides for ultimate impedance matching. The values of the resistors shown are, of course, such as to establish the desired detector output sensitivities. Each of the two center detectors is conveniently arranged to have 50% of the desired unit sensitivity so that their combined sensitivity will be equal to that of a single center detector as established in accordance with Table 1. Other types of circuits may, of course, be used to vary the detector outputs in the manner desired.

The present invention also contemplates the direct recording of adjusted detector outputs for later mixing or combination, and also the direct recording of unadjusted detector outputs for later processing of the recorded signals, including weighting the signals in accordance with the above derived expression for relative sensitivities and final mixing of the signals to produce the desired result.

Further improvements in noise suppression may be realized by compositing or mixing the outputs of two or more like groups 140 of detector arrays in the manner illustrated in FIG. 3. As is shown, the groups 140 are arranged in overlapping and substantially collinear relation relative to a ground line 39 through a shot hole 38 and on opposite sides thereof. The particular overlapping shown is symmetric, with the two half lengths of each detector group separately overlapping half lengths of two end-to-end detector groups on the opposite side of line 39. The output from the detector circuit 20 corresponding to each detector group is branched at 189 and separately combined in parallel with the outputs from circuits 20 corresponding to the two adjacent groups which overlap that particular group, and the resultant combined outputs are fed via cables 190 to the recording unit 17 for comparative recordation with combined outputs of other overlapped arrays. Appropriate one-way circuits 191 incorporating elements such as diodes are connected into the branches 189 to prevent mixing of outputs other than those derived from directly overlapping detector groups. The detector groups are, of course, similar to one another in length, detector spacing, number of detectors, and relative detector outputs according to the tapered output relationship previously described.

The centers of composited groups of arrays should be physically spaced apart a distance substantially greater than the distance between two detectors in an array. Other methods of compositing are, of course, available, and are useful to obtain the desired improvement in noise suppression.

Figure 7:
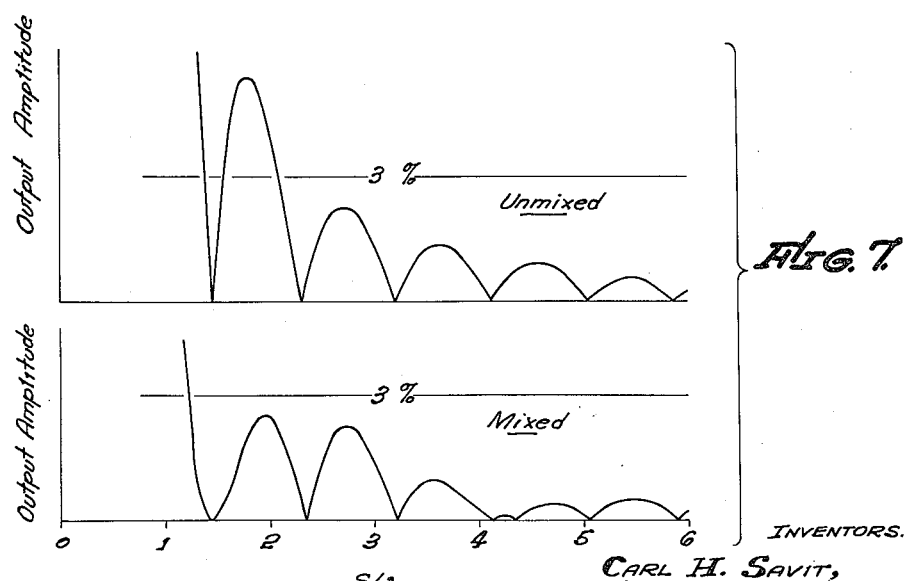
FIG. 7 is a graph comparing the output amplitudes of a single tapered array of detectors with the output amplitudes of two composited arrays of detectors.

The graph shown in FIG. 7 illustrates the improvement in amplitude suppression of noise energy that may be effected by compositing a pair of 21 element tapered arrays of detectors. As therein illustrated, output amplitudes of the composited arrays and of the single array are graphed as a function of the dimensionless quantity $S/\lambda$. The pair of composited arrays were center spaced apart a distance equal to seven times the spacing between adjacent detectors in either array.

Improved moveout discrimination may also be realized by weighting the several charges in an array of shot holes established in accordance with the foregoing output relationships as applied to the detectors. In addition, consideration must be given to the fact that the amplitude of ground motion due to the detonation of a single charge of explosive varies as the square root of the weight of the charge, and that the motions due to several charges may be added vectorially. Accordingly, the weight of the charges corresponding to the tapered group of Table 1 is given in Table 2 below.

Table 2

| | |
|---|---|
| $c_0 = 1.000$ | $c_6 = .350$ |
| $c_1 = .974$ | $c_7 = .224$ |
| $c_2 = .897$ | $c_8 = .121$ |
| $c_3 = .789$ | $c_9 = .050$ |
| $c_4 = .654$ | $c_{10} = .011$ |
| $c_5 = .496$ | |

The values in Table 2 for the relative weights of the charges in the shot hole array are obtained by taking the squares of the relative sensitivities set forth in Table 1. If more or less than a 21 shot array is desired to be established, the procedure would be to obtain the relative output sensitivities in accordance with the evaluation of $r_k$ and then take the squares of these sensitivities, giving the relative charge weights desired. The shot holes are arranged in the same manner as the detectors in the array illustrated in FIG. 1.

Figure 4:
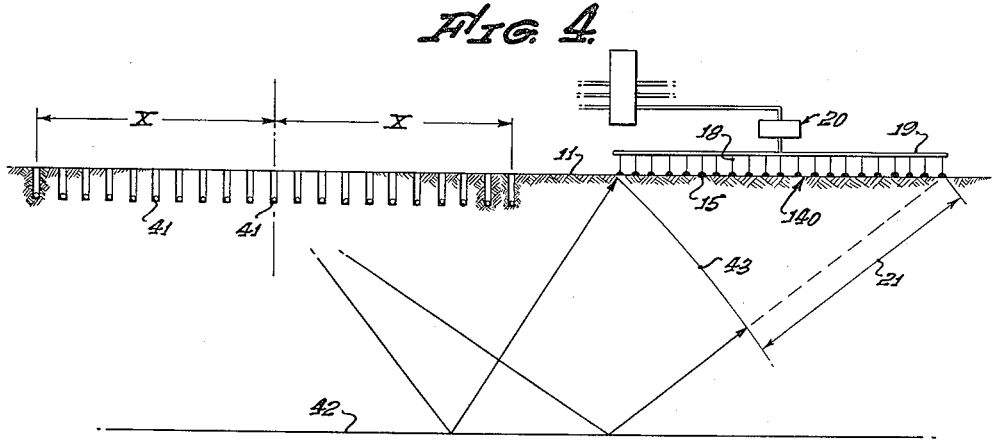
FIG. 4 is a vertical section through the earth illustrating the location of an array of variable charge shot holes with respect to a geologic section and a single detector array.

Such a shot hole array is illustrated in FIG. 4 showing 21 holes 41 spaced in a row beneath the surface 11 of the earth. It is, of course, possible to generate seismic signals with charges exploded at or above the surface 11. To detect reflected seismic signals, groups of detector arrays are spaced in a row or rows in the vicinity of the shot holes, only one such group 140 being shown for purposes of illustration.

If the charges in the shot holes are exploded simultaneously, there is formed a single seismic wave front moving downwardly into the earth to be reflected from interface 42. The total length of the array of shot holes 41 is normally so much smaller than the distance from surface 11 to interface 42 that the wave front may be considered to emanate from a point such as the center shot hole, and as a result the reflected wave front 43 arrives at the detector array to produce the same type of moveout relation as described in connection with FIG. 1.

The laterally travelling seismic wave fronts established by the explosions at the shot holes are classified as noise and are desirably suppressed through mutual wave cancellation, as effected by the particular weighting of the charges. Though not all of such waves are cancelled, the proportion thereby eliminated is substantial in relation to the total noise generated by the explosion, while at the same time the amplitude of the reflected seismic signal is strengthened due to the large number of shots used. As a result, the signal-to-noise discrimination at the detectors is sharply increased.

From the foregoing it will be apparent that improved discrimination as between reflected seismic signals and noise may be effected by providing either a tapered array of shot holes, or tapered arrays of detectors, or a combination of the two, the weighting of the shot hole charges and of the detector outputs being accomplished as described above.

We claim:

1. In seismology wherein seismic waves are detected at spaced points, said waves having moveouts and resulting from a seismic wave producing disturbance, and in which said detection is carried out to produce outputs, the steps that include establishing for a particular locality a preferred range of moveouts that includes the bulk of said wave moveouts, said establishing step including measuring seismic wave moveouts characteristic of said locality, combining said outputs to produce an output response, and adjusting said outputs to values substantially determined by the mathematical condition that the output response is a least squares best fit to unit response over a first range of reciprocal wave lengths corresponding to said preferred range of moveouts and to zero response over a second range of reciprocal wave lengths corresponding to moveouts outside of said preferred range, thereby to accomplish filtering of the detected seismic waves to accept seismic waves having moveouts within said preferred range and to suppress seismic waves having moveouts outside said preferred range.

2. In seismology wherein seismic waves are detected at spaced points, said waves having moveouts and resulting from a seismic wave producing disturbance, and in which said detection is carried out to produce outputs, the steps that include establishing for a particular locality a preferred range of moveouts that includes the bulk of said wave moveouts, said establishing step including measuring seismic wave moveouts characteristic of said locality, combining said outputs to produce an output response, and adjusting said outputs to values substantially determined by the mathematical process of minimizing the integral of the square of the difference between the value of said output response and the function which has the value one over a first range of reciprocal wave lengths corresponding to said preferred range of moveouts and has the value zero over a second range of reciprocal wave lengths corresponding to moveouts outside said preferred range, thereby to accomplish filtering of the seismic waves received by said detectors to accept seismic waves having moveouts within said preferred range and to suppress seismic waves having moveouts outside said preferred range.

3. The method as defined in claim 2, in which said waves are detected at ten points located at substantially equal intervals and in a row on each side of a center point, and in which the outputs are produced at said points in response to said detection and have the following progressively decreasing values $r$ corresponding to successive detection points 1, 2, 3 . . . 10:

| | |
|---|---|
| $r_1 = .987$ | $r_6 = .592$ |
| $r_2 = .947$ | $r_7 = .473$ |
| $r_3 = .888$ | $r_8 = .348$ |
| $r_4 = .809$ | $r_9 = .224$ |
| $r_5 = .704$ | $r_{10} = .105$ |

4. The method of claim 2 in which said outputs are produced by seismic wave detectors located at said points arranged at substantially equal intervals and substantially in a row extending on opposite sides of a ground center to form a detector array including detectors disposed oppositely of said center in substantially symmetric pairs, said outputs having amplitude responses defined in accordance with the expression:

$$r_k = \frac{X}{2\pi n}\int_{-\pi n/X}^{\pi n/X} A(\alpha) \cos \alpha \frac{kX}{n} d\alpha$$
$$+ \frac{1}{1+2n}\left[1 - \frac{X}{2\pi n}\int_{-\pi n/X}^{\pi n/S} A(\alpha) d\alpha\right.$$
$$\left. - 2\sum_{j=1}^{n} \frac{X}{2\pi n}\int_{-\pi n/X}^{\pi n/X} A(\alpha) \cos\alpha \frac{jX}{n} d\alpha\right]$$

in which:

$r$=amplitude response of any detector output
$k$=the detector whose output amplitude response is under determination, where $k$ increases in a direction away from said center
$n$=the selected number of detectors on each side of center
$X$=the selected length of the detector array on each side of center
$A(\alpha)=1$ when $\alpha$ is equal to or lies between 0 and $$\frac{n\pi}{dX}$$

$A(\alpha)=0$ when $\alpha$ is greater than $$\frac{n\pi}{dX}$$

$d$=a number equal to or less than the value of the expression $$\frac{nv}{2X\omega}$$

where:

$v$=a value of phase velocity less than the bulk of reflected seismic signal phase velocities as measured at said particular locality, and
$\omega$=a value of frequency greater than the bulk of transmitted shot frequencies as measured at said particular locality
$j$=an index of summation, and
$\alpha$=the variable of integration.

5. The method as defined in claim 4 in which the values of $n$ and $X$ defined therein are substantially as follows:

$n$=a whole number not less than 2
$2X$=a number of feet greater than the wave lengths of appreciable seismic noise incident on the detectors.

6. In seismological exploration wherein desirable and unwanted seismic disturbances and an air blast are detected by seismograph instruments responsive to a range of frequencies, filter means for producing a combination amplitude response that is a least squares best fit to unit response over a first range of moveouts corresponding to the bulk of said detected desirable seismic disturbances and to zero response over a second range of moveouts corresponding to the bulk of said detected unwanted seismic disturbances, said filter means including a plurality of seismic detectors for producing resultant output signals having varying amplitudes and a circuit electrically interconnecting said detectors for combining said signals to produce said combination amplitude response.

7. The invention as defined in claim 6 in which the detectors have output amplitude responses determined by the expression:

$$r_k = \frac{X}{2\pi n}\int_{-\pi n/X}^{\pi n/X} A(\alpha) \cos \alpha \frac{kX}{n} d\alpha$$
$$+ \frac{1}{1+2n}\left[1 - \frac{X}{2\pi n}\int_{-\pi n/X}^{\pi n/X} A(\alpha) d\alpha\right.$$
$$\left. - 2\sum_{j=1}^{n} \frac{X}{2\pi n}\int_{-\pi n/X}^{\pi n/X} A(\alpha) \cos\alpha \frac{jk}{n} d\alpha\right]$$

in which:

$r$=amplitude response of any detector output
$k$=the detector whose output amplitude response is under determination, where $k$ increases in a direction away from said center
$n$=the selected number of detectors on each side of center
$X$=the selected length of the detector array on each side of center
$A(\alpha)=1$ when $\alpha$ is equal to or less between 0 and $$\frac{n\pi}{dX}$$

$A(\alpha)=0$ when $\alpha$ is greater than $$\frac{n\pi}{dX}$$

$d$=a number equal to or less than the value of the expression $$\frac{nv}{2X\omega}$$

where:

$v$=a value of phase velocity less than the bulk of reflected seismic signal phase velocities as measured at said particular locality
$\omega$=a value of frequency greater than the bulk of transmitted shot frequencies as measured in said particular locality
$j$=an index of summation, and
$\alpha$=the variable of integration.

8. The invention as defined in claim 7 in which the values of $n$ and $X$ defined therein are substantially as follows:

$n$=a whole number not less than 2
$2X$=a number of feet greater than the wave lengths of appreciable seismic noise incident on the detectors.

9. The invention as defined in claim 6 in which said detectors include a center detector having unit relative amplitude response and ten detectors spaced on each side of said center detector, and in which the relative output amplitude responses of the side detectors have substantially the following progressively decreasing values corresponding to detectors spaced progressively away from said center detector:

| | |
|---|---|
| $r_1$=.987 | $r_6$=.592 |
| $r_2$=.947 | $r_7$=.473 |
| $r_3$=.888 | $r_8$=.348 |
| $r_4$=.809 | $r_9$=.224 |
| $r_5$=.704 | $r_{10}$=.105 |

10. The invention as defined in claim 6 in which said detectors are spaced apart at substantially equal intervals on the ground and in a row extending on opposite sides of a ground center to form a detector array including detector pairs substantially symmetrically located with respect to said center, each of said intervals being less than the wave lengths of the bulk of the air waves whose frequencies fall within the range of responsiveness of said instruments, said air waves being produced by said air blast, the overall length of said array being greater than the wave lengths of appreciable unwanted seismic disturbances whose frequencies fall within the range of responsiveness of said instruments, the output amplitude responses of said detectors progressively changing away from said center and the output amplitude responses corresponding to said substantially symmetrically located detector pairs being equal.

References Cited in the file of this patent

UNITED STATES PATENTS

| | | |
|---|---|---|
| 2,580,636 | Wolf | Jan. 1, 1952 |
| 2,698,927 | Parr | July 13, 1953 |
| 2,747,172 | Bayhi | Nov. 12, 1954 |
| 2,794,965 | Yost | June 4, 1957 |